R. H. BOWEN.
DEVICE FOR MEASURING TRANSMITTED TORSIONAL RESISTANCE.
APPLICATION FILED MAY 29, 1914.
1,198,518.
Patented Sept. 19, 1916.
3 SHEETS—SHEET 1.
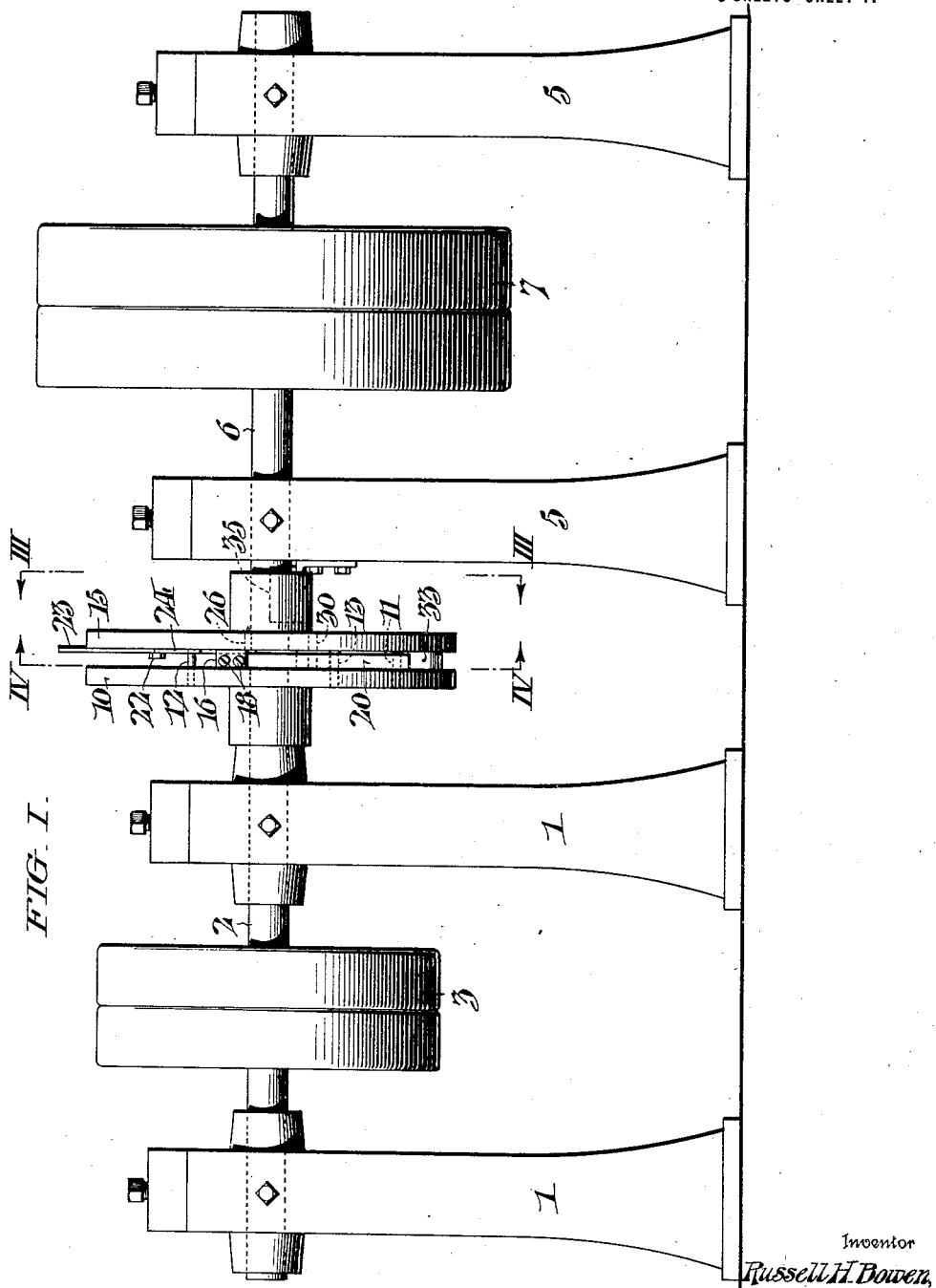

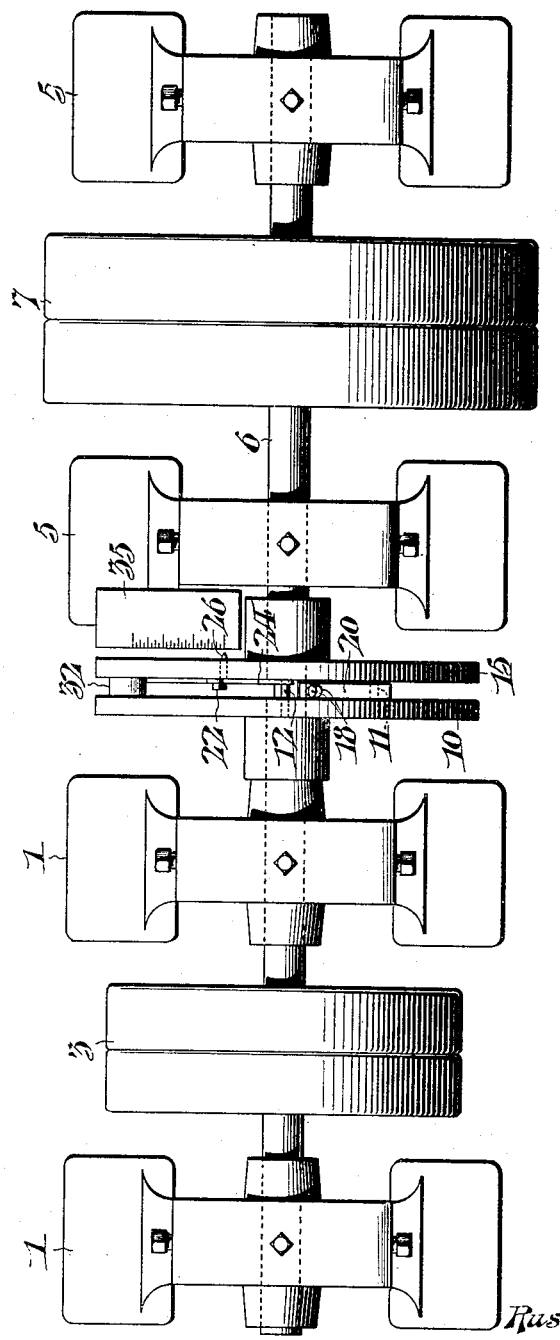

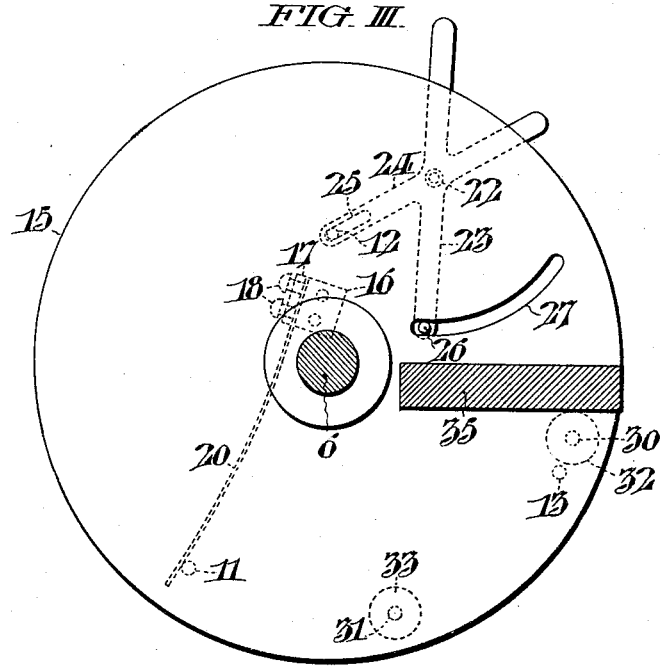
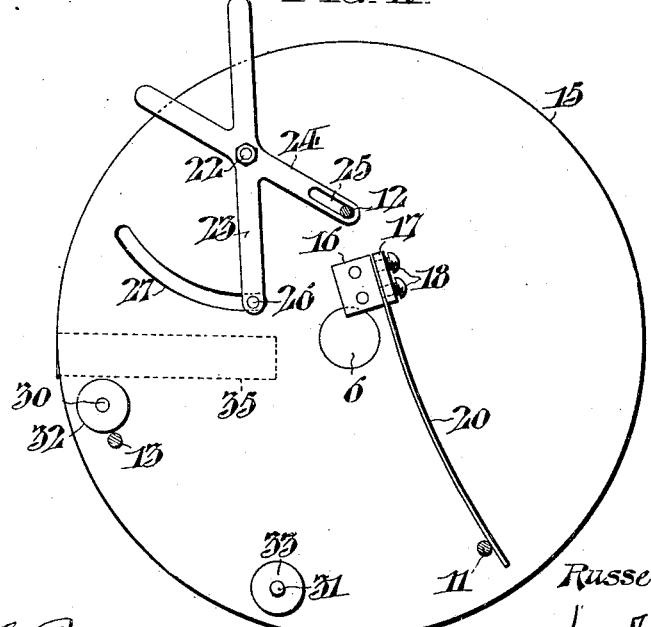

UNITED STATES PATENT OFFICE.

RUSSELL H. BOWEN, OF PHILADELPHIA, PENNSYLVANIA, ASSIGNOR OF ONE-HALF TO THE AMERICAN PULLEY COMPANY, OF PHILADELPHIA, PENNSYLVANIA, A CORPORATION OF PENNSYLVANIA.

DEVICE FOR MEASURING TRANSMITTED TORSIONAL RESISTANCE.

1,198,518. Specification of Letters Patent. Patented Sept. 19, 1916.

Application filed May 29, 1914. Serial No. 841,698.

*To all whom it may concern:*

Be it known that I, RUSSELL H. BOWEN, of Philadelphia, in the county of Philadelphia and State of Pennsylvania, have invented a certain new and useful Device for Measuring Transmitted Torsional Resistance, whereof the following is a specification, reference being had to the accompanying drawings.

The purpose, for which the embodiment of my invention shown in the drawings is particularly adapted, is the measuring of the amount of power required to rotate such a device as an ordinary belt pulley when not carrying any positive load. Thus, all such pulleys encounter some resistance to rotation, due to the friction of the air, and it is often desirable to compare different pulleys with a view to determining the factor of individual resistances in each instance.

The general organization of the device about to be described is one which lends itself to this particular employment, but I do not restrict the scope of the invention either to the general organization shown, or to the specific purpose above indicated.

Referring to the drawings, Figure I, is a view of the device in front elevation shown as mounted between two sets of bearings, one of which carries the driving element, and the other of which carries the pulley whose individual resistance to rotation is to be determined. Fig. II, is a top or plan view of the parts shown in Fig. I. Figs. III, and IV, are respectively views in side elevation of the inner and outer faces of one of the pair of disks which carry and actuate the coöperating elements, said figures showing certain coöperating parts in section.

Referring now to the general organization, 1, 1, represent a pair of uprights carrying the shaft 2, of an actuating member 3, which, in this instance, is itself a driven pulley, whose driving connections are not shown, but which comprise means for applying a known amount of horse power. A second pair of uprights 5, 5, afford bearings for the shaft 6, co-axial with the shaft 2, and carrying the pulley 7, whose factor of resistance is to be determined, and which, therefore, in this instance, may be considered as the driven member with relation to the so-called driving member, or pulley 3.

The shafts 2, and 3, are yieldingly coupled together by the device which constitutes my invention, and which in the form here shown, comprises the following parts: A disk 10, is rigidly attached to the end of the shaft 2, said disk having, upon its outer face projecting pins 11, 12, and 13, whose angular relation to one another, and radial arrangement with relation to the center of the disk 10, can best be noted by their sectional representations in Fig. IV. A second disk 15, is rigidly mounted upon the extremity of the shaft 6, and carries upon its outer face (which, is the one proximate to the disk 10), a group of members as follows: At a point near the center of the disk 15, a block 16, is secured to its outer face, said block being provided with a strip 17, and set screws 18, whereby one end of a resilient member, such as a leaf-spring 20, may be clamped in position, said spring extending in a generally radial direction to a point which enables its outer extremity to engage rotatively against the pin 11, mounted upon the other disk 10. The spring 20, therefore, constitutes, in this embodiment, the actual elastic coupling member by means of which rotative movement of the disk 10, is transmitted from the pin 11, to the disk 15, and from it to the pulley 7, carried by the shaft 6. Assuming that the disks 10, and 15, are initially arranged in such angular relation that the spring 20, is simply in contact with the pin 11, and that said spring 20, is then substantially straight, it is obvious that rotation of the disk 10, and consequent pressure of the pin 11, against the spring 20, will tend to deflect said spring from a straight line, and to the extent of such deflection the initial angular relation between the disks 10, and 15, will be displaced, by rotative movement of one disk with relation to the other. It is also obvious that the amount of said angular displacement will be definitely related to the degree of torsional resistance exerted at any given moment, or in other words, if the resistance to rotation manifested by the shaft 6, and its suspended parts, is relatively great, the angular displacement of the disks, due to the bending of the spring 20, will be increased. The increment of deflection of the spring 20, may not be constant, but by proper construction of said spring it can be rendered definitely progressive, and, therefore, the extent of angular displacement of the disks, corresponding to the deflection of the spring, can afford a proper measure of the power exerted.

The device which I have found it convenient to employ for noting the amount of angular displacement of the disk 15, with relation to the disk 10, is as follows: Upon the outer face of the disk 15, I mount freely upon a pivot 22, a swinging member, in this instance, a frame, comprising cross arms 23, and 24, the said arms being preferably made symmetrical on opposite sides of the pivot 22, so as to afford, as far as possible, a balance against the displacement which might be occasioned by the rapid rotation of the disk 15. The arm 24, is longitudinally slotted as shown at 25, said slot receiving the pin 12, which projects from the proximate face of the disk 10. The other arm 23 carries a pin 26, which extends through an arc-shaped slot 27, formed in the disk, 15, itself, said pin 26, therefore, projecting out beyond what may be called the rear face of the disk 15, to a sufficient distance to be plainly visible when the disks are rotating rapidly. The arc of the slot 27, is circumferential to the axis of the pivot 22, so that the pin 26, can move freely in said slot. The disk 15, also carries on its outer face a pair of stop pins 30, and 31, which may be surrounded by fiber washers 32, 33, whose purpose is to engage the pin 13, mounted on the proximate face of the disk 10, and thus form positive limits of displacement in each direction, in order to avoid injury to the spring 20, by too great strain.

A stationary scale piece 35, (shown in section in Fig. III, and in dotted lines in Fig. IV), is carried by one of the uprights 5, in such relation to the projecting pin 26, that the position of said pin as it rotates past the scale piece, can be noted with reference to the markings of the scale.

The radial position of the pin in the slot 27, with relation to the axis of the shaft 3, is the indicator, of the extent of the angular displacement of the disk 15, with relation to the disk 10, this result being due to the following conditions: When the disks are in what may be termed their normal position, the pin 12, will be seated at the outer end of the slot 25, and the pin, 26, will be the end of the slot 27, which is nearest to the axis of the shaft 3. When any displacement occurs, the arm 24, will be turned from its original position by contact with the pin 12, and will correspondingly turn the arm 23, thus moving the pin 26, outward along the slot 27. Assuming that the resiliency of the spring 20, is of a definite character, the extent of displacement of one disk with relation to the other will also be definitely progressive, and hence the radial position of the pin 26, in the slot 27, at any given moment will correspond with the consumption of a definite amount of power. The position of the outwardly projecting end of the pin may be noted with relation to the scale 35, so that if said scale be properly calibrated with reference to the known factor of resiliency of the spring on the one hand and a definite standard of horse power on the other hand, the position of the pin 26, with relation to the markings of the scale will enable the observer to determine the amount of horse power which corresponds with the torsional resistance of the driven pulley, which is undergoing the test. The scale may be calibrated by any convenient method, such, for instance, as the application of a Prony brake, of known qualities, to the shaft 6, when rotated without carrying any pulley.

Having thus described my invention, I would state that I have employed the term "disk," as comprehending the form of member which is most conveniently adapted to carry the respective groups of working parts, but I do not by such term intend to limit myself to that specific form. I have also shown a leaf spring as the preferred coupling element, but the invention is not necessarily limited to this form of spring, it being only necessary that the device should include a definitely elastic coupling member for performing the function above described. It is also proper to note that while the swinging member which intervenes operatively between the disks, is, in the instance shown, a frame comprising cross arms, the invention is not limited to this particular embodiment of such intervening member.

I claim:

1. In a measuring device, the combination of two rotatable members independently mounted to permit relative angular displacement and adapted respectively to be connected to a driving element and a driven element; a spring mounted upon one of said members; a pin mounted upon the other of said members and arranged in operative relation to said spring; a swinging element pivotally mounted upon one of said rotatable members and provided with a projection extending laterally with respect to its plane of swinging movement, the rotatable member to which said swinging member is pivoted being provided with an elongated opening adapted to receive said projection and permit free movement thereof throughout an extended arc, said swinging element being also provided with a substantially radial slot; and a projection carried by the other rotatable member and arranged to engage operatively within the radial slot of the swinging element, substantially as set forth.

2. In a measuring device, the combination with a pair of carrier disks adapted to be secured respectively to a driving and a driven shaft, of a spring mounted upon one of said disks; a pin mounted upon the other of said disks and arranged in operative relation to said spring; a frame comprising cross arms, pivotally mounted upon one of said disks, said last mentioned disk being provided with a slot at the region adjacent to one of said cross arms; a pin mounted upon said last mentioned cross arm, and arranged to extend through said slot and project substantially beyond the face of said disk; the other of said cross arms being provided with a slot; a pin mounted upon the other disk and arranged to engage within the slot of the cross arm; and an indicator scale mounted in proximity to the path of travel of the pin, which is mounted upon the cross arm.

In testimony whereof, I have hereunto signed my name at Philadelphia, Pennsylvania, this twenty-fifth day of May, 1914.

RUSSELL H. BOWEN.

Witnesses:
WALTER P. ARNAIZ,
RICHARD J. WALTHER.

Copies of this patent may be obtained for five cents each, by addressing the "Commissioner of Patents, Washington, D. C."